United States Patent [19]

Secor

[11] 4,050,643
[45] Sept. 27, 1977

[54] EXPANDABLE CORE-SHAFTS

[75] Inventor: Arthur D. Secor, Luna Pier, Mich.

[73] Assignee: Great Lakes Industries, Inc., Toledo, Ohio

[21] Appl. No.: 577,777

[22] Filed: May 15, 1975

[51] Int. Cl.² ............................................ B65H 75/24
[52] U.S. Cl. .................................. 242/72 R; 279/2 A
[58] Field of Search ............... 242/72 R, 72 B; 279/2, 279/4; 252/72, 78; 269/48.1

[56] References Cited

U.S. PATENT DOCUMENTS

| | | | |
|---|---|---|---|
| 2,382,082 | 8/1945 | McGregor et al. | 252/78 |
| 3,025,071 | 3/1962 | Larrad | 242/72 X |
| 3,108,757 | 10/1963 | Williams et al. | 242/72 B |
| 3,122,376 | 2/1964 | Atherholt | 242/72 B X |
| 3,334,839 | 8/1967 | Carlson | 242/86.51 |
| 3,391,878 | 7/1968 | Naccara | 242/72 B |
| 3,498,920 | 3/1970 | Nichols et al. | 252/72 |
| 3,692,549 | 9/1972 | Martin | 252/72 X |
| 3,823,892 | 7/1974 | Glaser | 242/72 |

OTHER PUBLICATIONS

*Bellofram Rolling Diaphragms,* Bellofram Corporation, 1960, 1962.

*Primary Examiner*—Stanley N. Gilreath
*Assistant Examiner*—John M. Jillions
*Attorney, Agent, or Firm*—Hugh Adam Kirk

[57] ABSTRACT

A shaft for gripping the inside diameter of the cores for winding webs such as of paper, plastic films, metal foils, fabric, and the like, which shaft has integrally therein a longitudinal fluid pressure manifold duct connecting spaced radially projectable core gripping rams or pistons. The fluid may be a gas such as air for smaller shafts, but preferably the fluid is a dimensional stable hydraulic liquid which may contain colloidally suspended metallic solids. Preferably the gripping rams or pistons are controlled from an hydraulic master cylinder mounted near one end of the shaft to form an integral unit. Preferably also the master cylinder and rams are statically sealed by rolling type diaphragm means. The piston in the master cylinder may be operated by a circumferential sleeve threaded to said cylinder and locked in position by a lock ring or nut. The radially expandable rams may contact directly the inside diameter of the cores they are to hold, or may operate through cylindrical segments, shells or leaves with friction engaging outer circumferential surfaces that grip the inside of the cores. These leaves may be provided with radially movable guide pistons mounted in the outer circumference of the shaft. Either or both of the radially extendable guide pistons and rams are normally urged in their retracted positions by spring means associated therewith. A pressure regulator or accumulator may be provided in the opposite end of the shaft connected to the manifold duct for limiting the pressure which can be applied to the rams.

18 Claims, 11 Drawing Figures

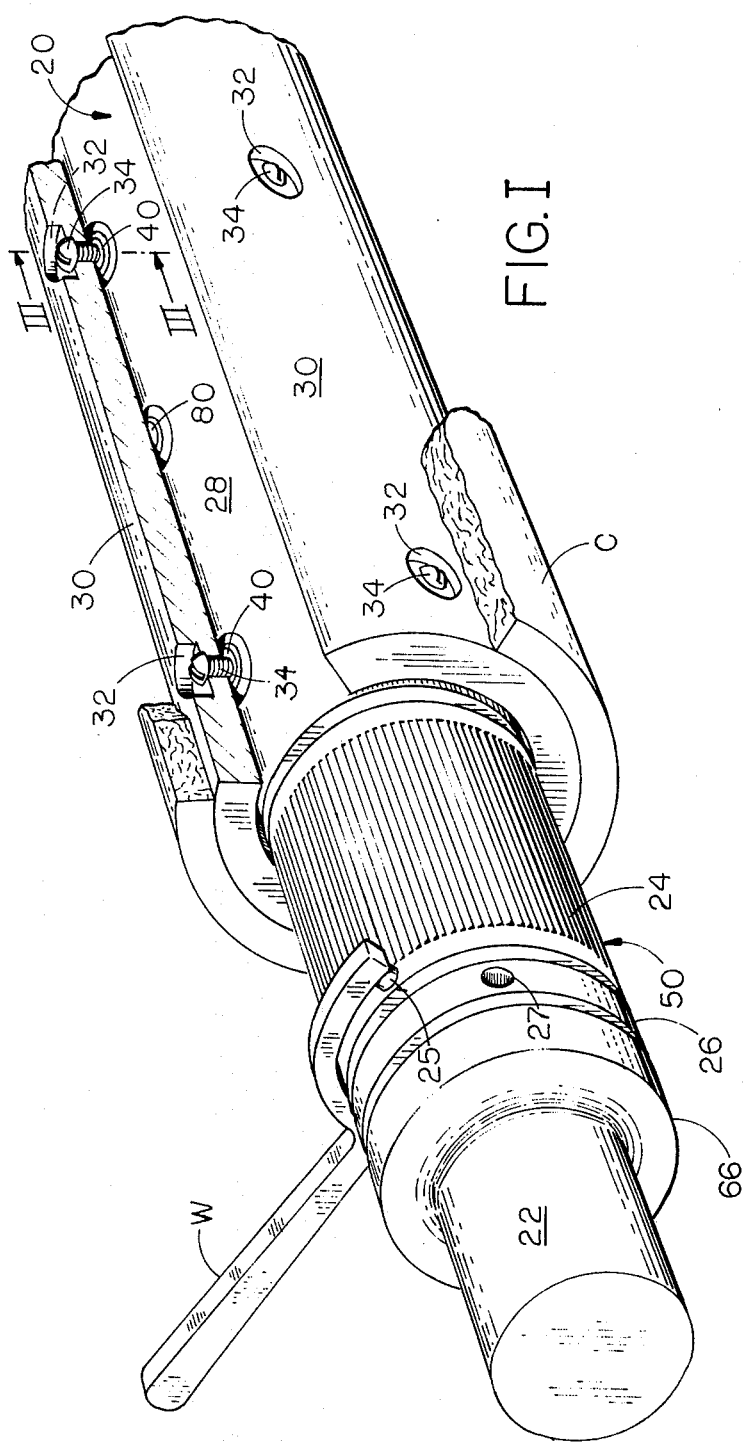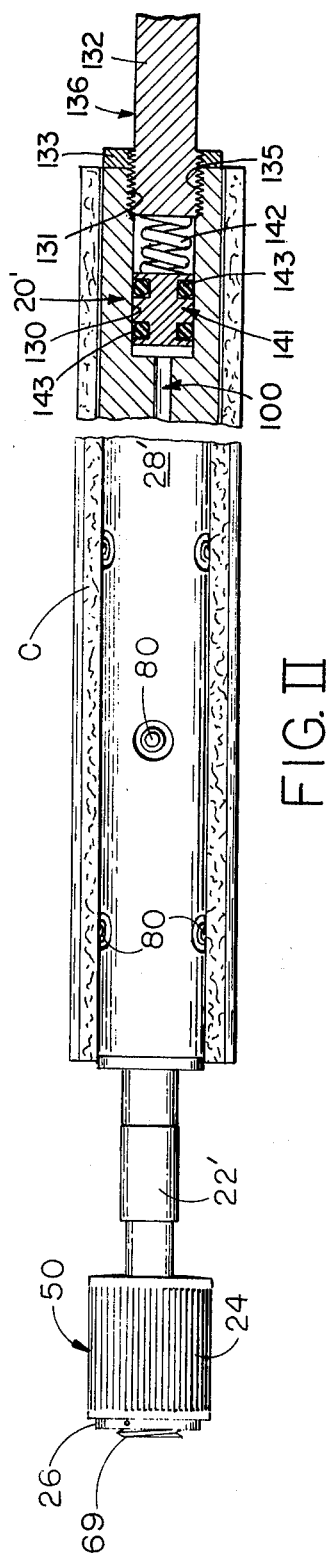

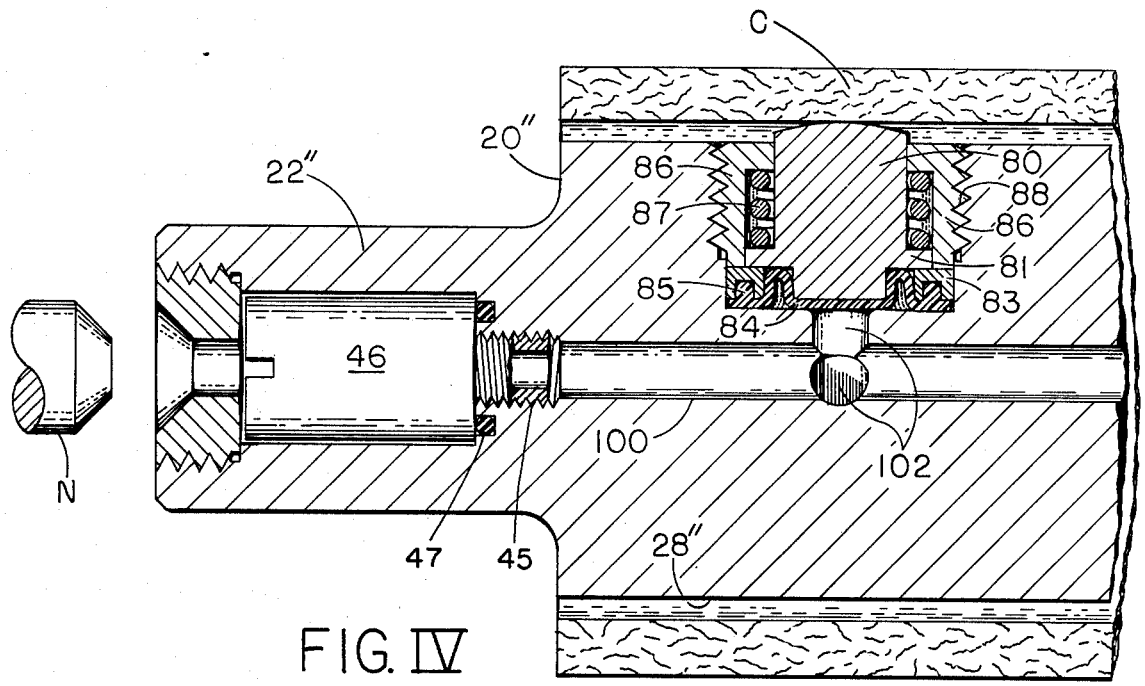
FIG. IV
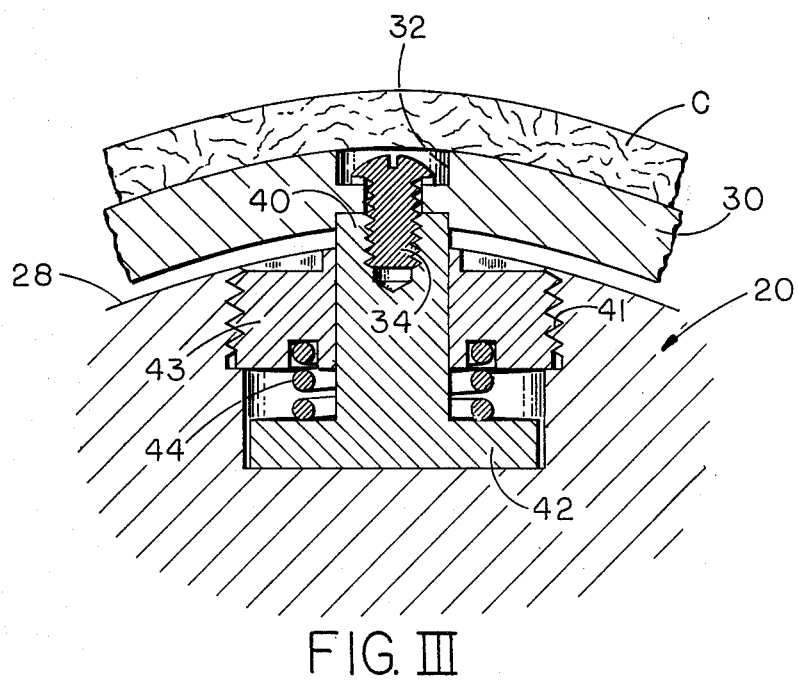
FIG. III

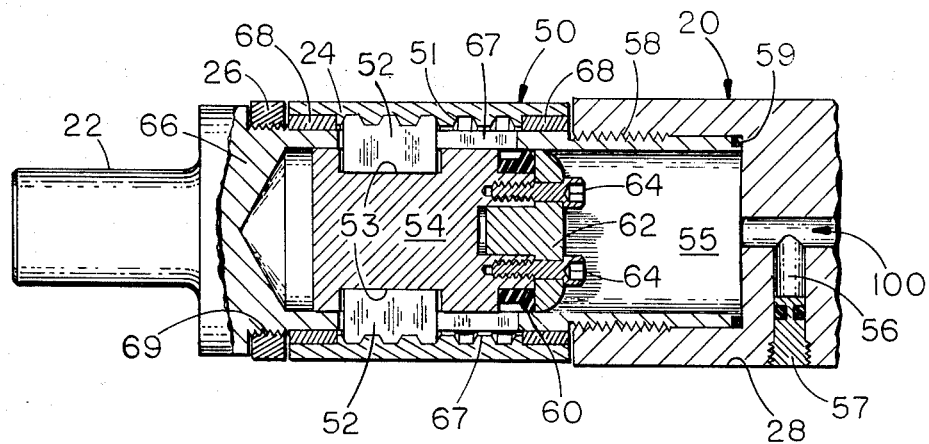
FIG. V
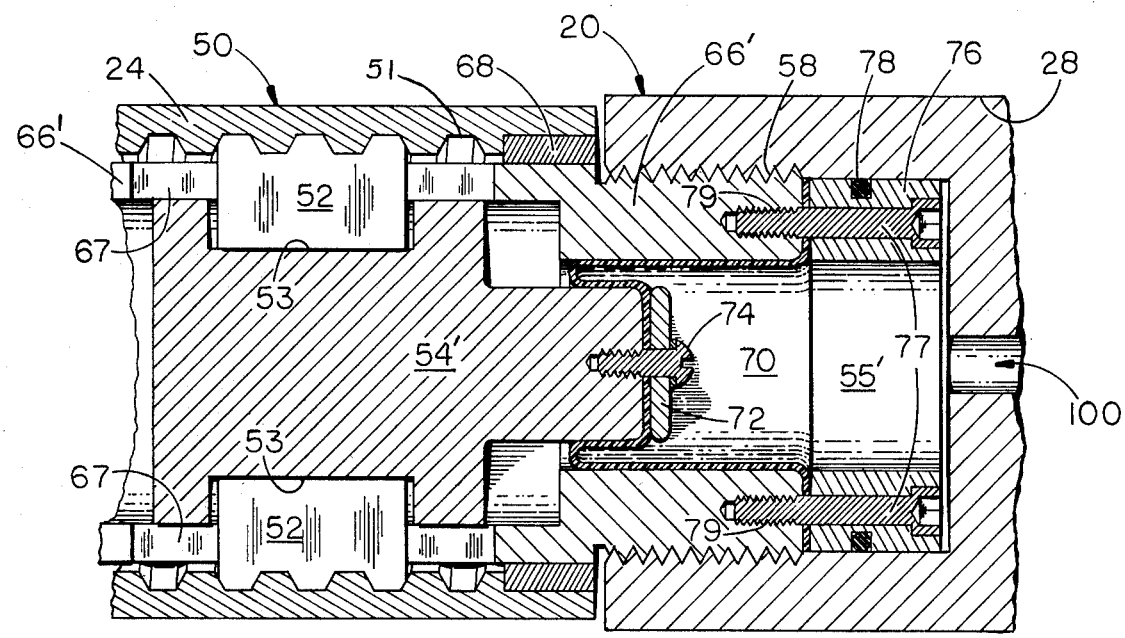
FIG. VI

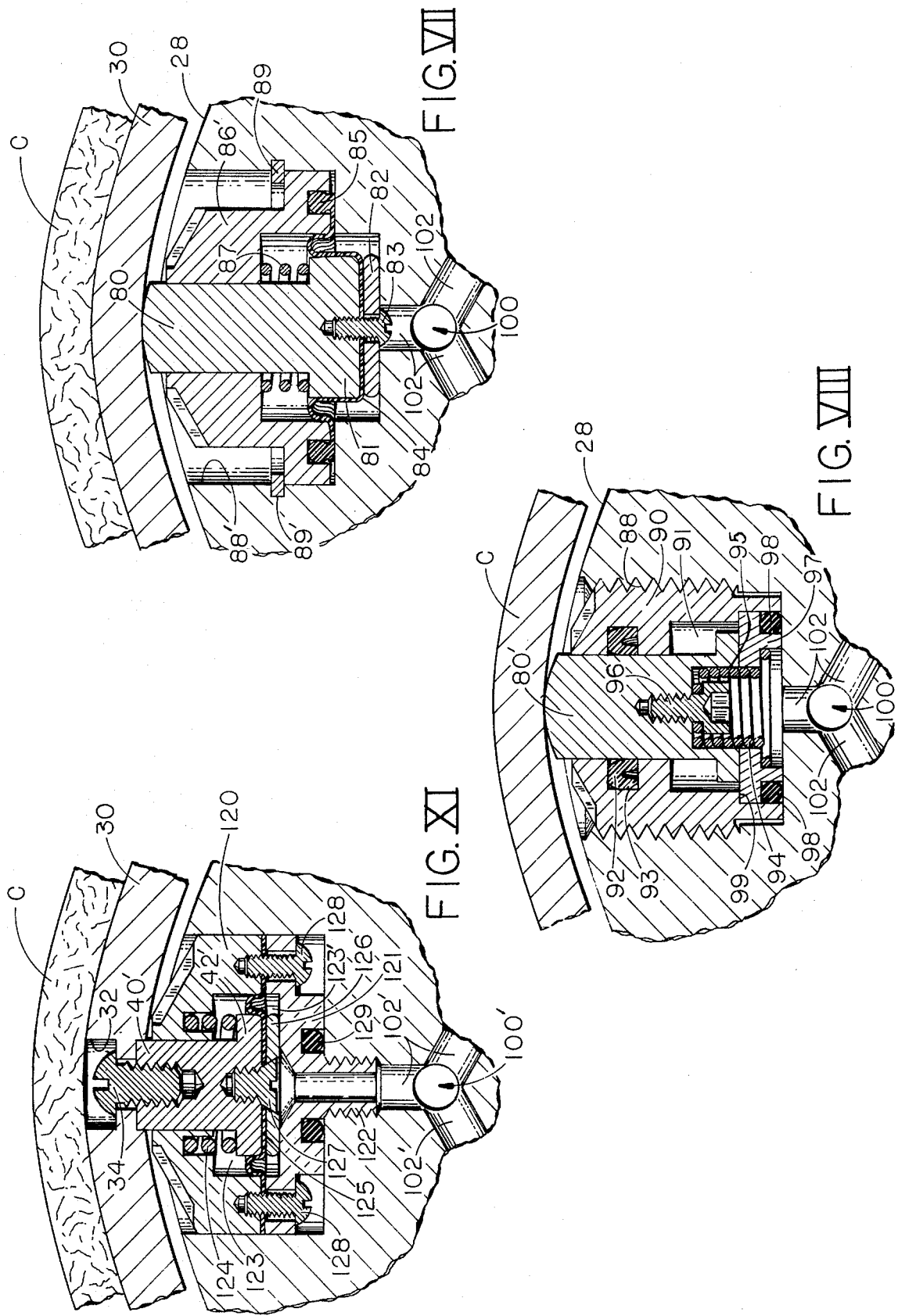

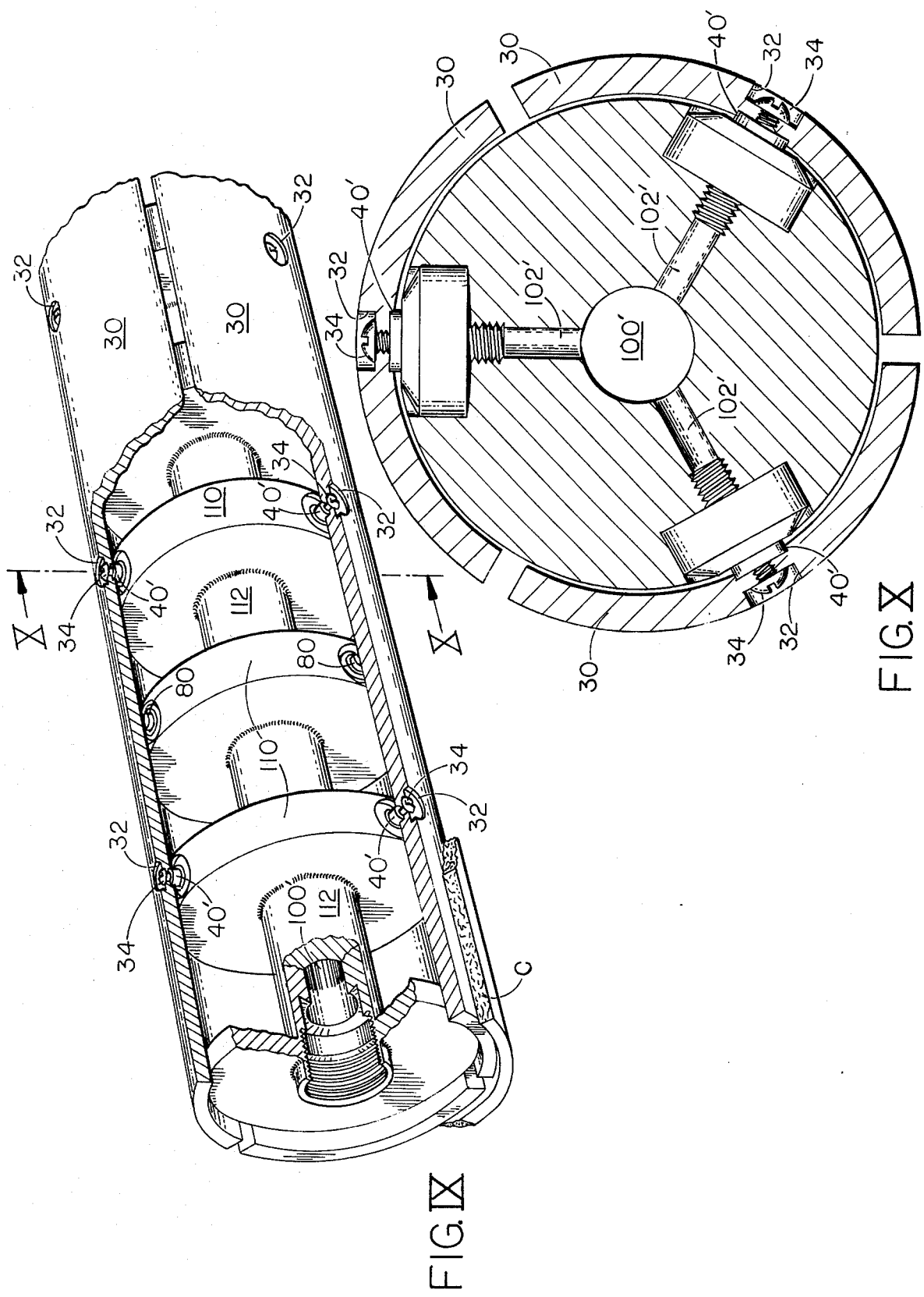

EXPANDABLE CORE-SHAFTS

BACKGROUND OF THE INVENTION

Previously expandable shafts for releasably gripping the inside diameter of the cores for winding webs, which shafts contained radially extending rams operated by fluid pressure, often failed because they were unable to: (a) seal statically, (b) prevent leakage when sliding seals were used, (c) prevent rupture when rubber inflatable bags were used, and/or (d) control the stability of the pressuring fluid.

Radially extending rams from such shafts to grip the inside of the cores of rolls of web, not only had to continuously grip radially outwardly but also were under large rapid varying stresses tangential to the shafts due to the torques and vibrations of the roll of web when changing its speed of rotation as in starting, accelerating, driving, braking, and stopping. This caused side wear in the piston rams or plungers, making annular seals between the relatively sliding parts, including O-rings, substantially useless, particularly at higher pressures, because of their leakage and/or seepage.

In a closed hydraulic liquid system of this type, less than 0.1% loss of fluid can prevent the maintenance of an operable pressure. The stability of the hydraulic liquid also is critical, since expansion or contraction from heat or cold changes the volume enough, respectively, either: to activate the rams, or to reduce the volume of the liquid below the capacity of the system so that pressurizing is impossible.

Gas or air operated fluid systems which use inflatable bags have proved to be undesirable under heavy loads because they are limited to the amount of initial pressure they need or have available, and the gas is further compressible under such heavy loads, whereas a liquid is relatively noncompressible. Furthermore, such bags tend to develop leaks under heavy loads because of their limited strength and because of their wear through vibration and their contact with the rams and/or leaves against which the bags press to grip the cores during operation.

Because of these variations in fluid pressure during operation, leakage often occurs, particularly when relatively long periods of lock-up or gripping of the shafts against cores is required, i.e. up to about 24 hours. Therefore a continuous or constant supply of fluid pressure from an outside source is required, which means a movable joint connection to the shaft which further causes leakage, and which means the additional expense for and complexity of an outside fluid pressure system.

Still further, the amount of pressure which could be maintained in such shafts, either by means of a bag expanded against the gripping pistons, or by direct pressure against such gripping rams or pistons, was rarely above about 200 psi, and usually was between about 100 and 200 psi, thus limiting the amount of grip which could be applied to a core to be rotated on such shafts.

Accordingly, the purpose of this invention is to eliminate these difficulties.

SUMMARY OF THE INVENTION

Generally speaking, the expandable core-shaft of this invention comprises a cylindrical shaft with an axial manifold duct communicating with a plurality of radially extending core gripping pistons or rams, each resiliently urged inwardly and forced outwardly by a source of fluid pressure inside or outside the shaft to directly, or through segmented leaves, frictionally engage the inside surface of a core upon which a web is to be wound. Such core shafts usually have lengths from a few feet up to about thirty feet. If a relatively large diameter shaft is required, the radial extending pistons can be located in the peripheries of spaced disks integrally mounted to the shaft, which disks have radial ducts therein. Preferably the radial ducts are angularly spaced 120° apart circumferentially, however there may be more than three in a circumference, and they may be axially spaced along the shaft either in alignment or staggered.

The cylindrical core shaft may have a coaxial master cylinder located either inside or outside of one of the end bearings for the shaft to form a self contained unit. This master cylinder may be controlled by an outside fluid pressure source, or may be controlled mechanically by a manually rotatable outwardly knurled and inwardly threaded sleeve which engages correspondingly threaded diametrically located slide blocks for axially moving the piston in the hydraulic master cylinder. This piston then forces a dimensionally stable hydraulic liquid from the master cylinder chamber through the manifold duct to extend equally all of the gripping rams which are connected to corresponding pistons in radially outwardly extending ducts evenly spaced along and around the circumferential cylindrical surface of the shaft. Adjacent one end of the master cylinder there may be provided a locking threaded ring or nut for locking the threaded sleeve that operates the master cylinder in a desired position, and a wrench means may be provided for turning both the master cylinder sleeve and its locking nut in order to insure increased pressure and the holding of that pressure on to the radially expandable gripping rams or plungers. The manifold of pressured ducts of the system is connected to an accumulator or limiting pressure regulator, such as a spring applied piston, at the other end of the shaft from the master cylinder, in order to prevent the master cylinder from building up too much pressure on the rams to blow them and/or their diaphragms out of the shaft.

Preferably, these radially extending gripping rams or pistons, and preferably also the master cylinder piston, are provided with rolling or flat type diaphragms between the inner ends of their pistons and their piston chambers, which diaphragms may include integrally circumferential gasket type sealing O-rings. The rolling type diaphragm referred to here is one which is of a pushed-in hat shape with two concentric cylindrical walls which telescope with respect to each other by rolling off the piston wall onto the cylinder wall, and vice versa. One embodiment of this type of rolling diaphragm is disclosed in the Taplin U.S. Pat. No. 2,849,026 issued Aug. 26, 1958. These diaphragms eliminate sliding friction between the pistons and their cylinders thus reducing leakage as well as permitting relatively long piston movements. However, if such diaphragms are not used, a hydraulic liquid is employed containing colloidally suspended metallic particles, which particles tend to fill any scratches or cavities that may be produced in the sides of the cylinders due to sliding friction between them and their pistons, thus reducing the possibility of leakage in the cylinders.

The outwardly extending gripping rams or pistons may be provided with button ends for directly engaging the inside diameter of the cores to be gripped, or they may push against, or be directly connected to, segmental sleeves, shells or leaves with outer frictional surfaces which engage the inside of these cores. If they are not anchored directly to these shells or leaves, these shells are guided by radially extending guides, similar to the radially extendable rams or pistons. Both the gripping and guiding pistons preferably are urged inwardly by helical springs. These guides for the cylinders are also circumferentially arranged along and around the outer surface of the shafts, and their shells or leaves preferably are divided into 120° segments, however the segmentes may be smaller in circumferential angular dimension, if desired. These shell segments extend substantially the full length of the shaft, and preferably at least the full length of the inside diameter of the core to be gripped. In the event a large diameter shaft is employed so that axially space disks along the center shaft are used, alternate ones of these disks may be for the guides for the shells or leaves, with only the intermediate disks being provided with radial ducts for operating the extendable rams, or the guides also may be connected to radial ducts and also be fluid pressure operated extendable rams.

It is very essential that the hydraulic fluid for the larger and/or self contained core-shafts is a dimensional stable liquid, namely one that has an expansion of less than about ½ percent within the temperature range in which it is to be used, which range is between at least about 60° and 100° F. and preferably between about 0° and 200° F. This means that the oil must have a relatively high viscosity index. Suitable oils for this purpose have been found to be some silicone oils and a naphthenic base oil containing a viscosity index improver, a rust inhibitor, and an anti-foaming agent.

A radial tap or sealable duct may be provided adjacent the edges and communicating with the master cylinder of the self-contained unit for filling the shaft with hydraulic liquid. However, if a small shaft or one requiring relatively low fluid pressure is employed, a gas or air tire type check valve may be provided near or at the end of the shaft for introducing, maintaining and releasing pressure in the shaft.

OBJECTS AND ADVANTAGES

Accordingly it is an object of this invention to produce a simple, efficient, effective, economic, non-leaking fluid pressure expandable core-shaft.

Another object is to produce such a core-shaft which is self-contained, hydraulically expandable, easily and manually adjustable for variable pressures up to about 1000 psi, and which pressures can be locked and maintained during use and can be readily released to retracting its grip for easy removal of the shaft from a core.

Another object is to produce such a core-shaft which will not tear the core, and will provide a uniform gripping throughout the inside diameter of the core, and which will limit the maximum pressure which can be applied to the system.

Another object is to produce such an expandable core-shaft which is made of standard parts, has a minimum of movable parts, is easily and quickly adjustable with standard tools, has a simple design, and requires relatively little maintenance.

Another object is to produce an hydraulically expandable core-shaft containing a very low co-efficient of expansion or dimensionally stable hydraulic liquid that has less than about one half of a percent change in volume throughout its usable temperature range so that changes in temperature will not effect materially its gripping pressure on the core.

Another object is to produce an hydraulically expandable core-shaft containing an oil having colloidally suspended metallic particles which fill scratches and/or crevices that may occur in the pistons and cylinders and other relatively movable parts in the apparatus, to reduce leakage of the oil that would cause a reduction in its pressure.

A further object of this invention is to produce such a core-shaft containing pistons all of which are statically sealed by rolling type diaphragms to reduce side thrust effects that produce scratches on the movable pistons and rams, thereby reducing the amount of initial machining of these parts, and still permitting relatively long strokes for the pistons so that they may be retracted further for easy removal from cores.

Still another object is to provide such core-shafts with pistons operated by rolling type diaphragms which have sealing type O-rings integrally formed in their peripheries for further reducing places where leakage can occur.

BRIEF DESCRIPTION OF THE VIEWS

The above mentioned and other features, objects and advantages and a manner of obtaining them are described more specifically below by reference to embodiments of this invention shown in the accompanying drawings wherein:

FIG. I is a perspective view of one end of an hydraulically expandable core-shaft according to one embodiment of this invention showing a part of a core and one of the leaves thereon broken away, and a wrench engaged for turning the sleeve for operating the piston of the master cylinder adjacent one end bearing of the shaft;

FIG. II is a side elevation of another embodiment of a self-contained core-shaft similar to and reduced in size to that shown in FIG. I, with parts broken away to show the radially extendable gripping ram buttons in longitudinally staggered configuration and in direct contact with the core without segmental leaves, and with the master cylinder shown outside the bearing on one end of the shaft, instead of inside as shown in FIG. I; and with a pressure maintaining and limiting means at the other end of the shaft.

FIG. III is an enlarged radial section of one of the guides for a leaf taken along lines III—III in FIG. I;

FIG. IV is an enlarged longitudinal section of one end of a further embodiment of a relatively small diameter gaseous fluid operated core-shaft, showing one of the rolling type diaphragms for operating a radial gripping ram, and a check valve axially in the bearing of the shaft;

FIG. V is a longitudinal section of one embodiment of a master cylinder and piston as shown in FIG. I or II;

FIG. VI is further enlarged longitudinal section of another embodiment of a master cylinder and piston, which may be used in place of the embodiment in FIG. V;

FIG. VII is an enlarged transverse section of another embodiment of a gripping ram or piston that may be used in place of the one shown in FIG. IV or in one of the embodiments shown in FIGS. I and II;

FIG. VIII is an enlarged transverse section of a further embodiment of a radial extendable gripping ram or piston as shown in FIG. VII;

FIG. IX is a perspective view of one end of a larger diameter coreshaft according to another embodiment in this invention having the radial extending gripping pistons and leaf guides mounted in longitudinally spaced disks along a central shaft, with part of two leaves therefor broken away, and part of a core shown broken away between two leaves;

FIG. X is an enlarged transverse section taken along lines X — X of FIG. IX through one of the disks provided with guide and gripping pistons supporting and operating the expandable leaves; and FIG. XI is an enlarged transverse section similar to FIG. VII or VIII of one guide and gripping piston for a leaf as shown in FIGS. IX and X.

DETAILED DESCRIPTION OF PREFERRED EMBODIMENT

In FIG. I there is shown one end of an hydraulically expandable coreshaft 20 according to one embodiment of this invention having an end bearing portion 22 of lesser diameter than the main shaft 20 adjacent which is provided a master cylinder 50 showing its outwardly knurled operating sleeve 24 and its adjacent locking ring or nut 26 having a radially inwardly extending hole 27 for engagement of the trunnion grip end of the wrench W shown in engagement in a corresponding hole 25 in the periphery of the sleeve 24. The outer cylindrical surface 28 of the shaft 20 is shown surrounded by segmental sleeves, shells or leaves 30, the outer surfaces of which may be roughened, coated, or plated, as desired, to frictionally engage the inside diameter of a core C which may be made of a fibrous material and used for the wrapping thereon paper, plastic films, metal foils, fabric, or the like type webs. The longitudinal segmental leaves 30 are herein shown to be divided into 120° arcuate segments (shown more clearly in FIG. X), and are herein shown to be provided with recessed holes 32 into which screws 34 fit for removably anchoring the leaves 30 to guide and/or gripping rams or pistons 40 and/or 40', as more specifically shown in FIGS. III and XI and described in more detail below. Also shown in FIG. I is one of the radially extendable gripping rams or pistons 80 which pushes outwardly against the inside of the leaves 30 or directly against the inside of the core C (as shown in FIGS. II, IV and VIII) as being a means for expanding the circumference of the mandrel shaft 20. Different embodiments of these gripping rams or pistons will be described later in connection with FIGS. IV, VII, VIII and IX below.

FIG. II shows another embodiment of a core-shaft 20' of this invention in which the master cylinder 50 and its locking ring or nut 26 are provided outside the bearing 22' instead of inside thereof as shown in FIG. I. At the other end of the shaft 20' is shown a pressure limiting and maintaining means 141 for the self-contained hydraulic system in the coreshaft of this invention, which means 141 will be described in more detail in the following Master Cylinders section. Furthermore this embodiment does not disclose the leaves 30 or their guides 40 as shown in FIG. I, but instead shows the radially outwardly extending rams or pistons 80 directly in contact with the inside diameter of a core C upon which the web is to be wound.

In FIG. III there is shown one embodiment of how the guide piston 40 for the leaves 30 are anchored into the body of the shafts 20, through a threaded hole 41 that radially extends inwardly from the outer surface 28 of the shaft 20. This hole 41 has a larger diameter than the outer end of the guide piston 40, which piston has a flanged inner end 42 substantially the same diameter as the hole 41. Threaded into the outer end of the hole 41 is a holding nut 43 for compressing a helical spring 44 between it and the flange 42 for normally urging the leaves 30 into their retracted, or smaller core-shaft diameter, positions. The combination guide and extendable piston or plunger embodiment 40' will be described in more detail later in combination with the embodiment shown for the larger diameter core-shafts in FIGS. IX, X and XI.

FIG. IV shows still another embodiment of a simple relatively small diameter core-shaft in which comparatively little pressure is required, such as for cores for wrapping webs of tape or tissue-type papers forming rolls of relatively small diameter. For such core-shafts the pressure required for operating the gripping ram pistons is generally not more than about 10 psi, and accordingly leakage is not such an important problem. Thus in this embodiment the relatively small diameter shaft 20" and its end bearing 22" may be provided with an axially extending manifold duct 100, which duct is threaded at 45 and then enlarged at one end in the hub for locating a check valve 46 sealed in the enlarged duct by means of O-rings 47 so that the duct 100 with its radial branches 102 to the rams 30 may be pressurized by means of an outside air pressure type nozzle N, partially shown ready for engagement with the end of the shaft 20" adjacent the check valve 46. In this embodiment the rams 80 are shown to engage directly the inside of the core C for the webs to be wound thereon.

MASTER CYLINDERS

Referring now to FIGS. V and VI, there are shown respectively two different embodiments of the master cylinder, the former of which is provided with a sliding gasket 60 on the piston 54 engaging the walls of the cylinder chamber 55, while the latter is provided with a rolling type diaphragm 70 between the piston 54' and the walls of the cylinder chamber 55'. Both master cylinders 50 in FIGS. V and VI are mechanically manually operable by rotation of their sleeves 24 which are internally threaded at 51 to axially move correspondingly threaded diametrically opposite sliding blocks 52 seated in notches or flats 53 in pistons 54 and 54' for imparting axial movement to the pistons 54 and 54' in their chambers 55 and 55' and thereby push against an hydraulic liquid in said chambers. This liquid may be introduced and sealed in these chambers and their connecting manifold ducts 100 through a radial duct 56 in FIG. V by removal of its sealing plug 57 recessed below the surface 28 of the shaft 20. These master cylinder chambers 55 and 55' may have their outer walls threaded at 58 for anchoring into correspondingly threaded hollow ends of the shaft 20.

The master cylinder 55 may be sealed to the shaft 20 at its inner end by means of an O-ring or gasket 59. Clamped into the base of the piston 54 adjacent the chamber 55 is a piston ring gasket 60 which may be held thereto by means of plate means 62 held by screws 64. In this embodiment it is desirable that the hydraulic fluid employed contain colloidally suspended metallic particles so as to fill any of the scratches which may occur in the walls of the cylinder 55 due to the sliding contact between the gasket and piston and these walls, thus reducing leakage of pressurized liquid from the system as much as possible. These master cylinders 50 may comprise hollow cylindrical container like extensions 66 or 66' at one end of the shaft 20 or 20', which extensions 66 or 66' contain slots 67 into which the blocks 52 slide and are guided. These extensions 66 and 66' also may carry end bearings 68 for the sleeves 24, as well as external threads 69 for the lock nuts 26. The outer ends of these extensions 66 or 66' also may include end bearing 22 for the core-shaft 20.

Referring now to the embodiment of master cylinder 50 as shown in FIG. VI, similar parts have been labeled with the same or similar reference characters, but instead of having a slidable gasket 60 as shown in FIG. V, there is provided a rolling type diaphragm 70 attached to the end of the piston 54' adjacent the chamber 55'. This diaphragm 70 preferably is attached by means of a plate 72 and a screw 74 to the center end of the piston 54', and may be clamped at its peripheral edge to the end of the master cylinder wall 66' by means of a ring 76 held by bolts 77 screwed through the peripheral edge of the diaphragm 70 and into threaded holes 79 in the end of master cylinder wall 66'. The ring 76 may be provided with sealing O-ring 78 to seal it in the threaded cavity in the end of the shaft 20, or instead of this ring 76 the peripheral edge of the diaphragm 70 may have an integral O-ring gasket such as shown for the piston diaphragm 84 in FIG. IV. In this embodiment there is no direct contact between the piston and cylinder in the chamber 55' where the hydraulic fluid is held and pressurized, and thus there is no necessity for providing a hydraulic oil with colloidally suspended metallic particles in it. However, such an oil may be used, if desired. Communicating with the chamber 55' there is shown the end of the manifold duct 100 that extends to all the cylinders and/or diaphragms of radially extendable gripping plungers or rams 80, or 80' mounted in the body of the shaft 20 or 20'.

In order to limit the amount of fluid pressure which can be applied to the core-shaft, there may be provided a pressure maintaining and limiting piston and cylinder means 141 as shown in FIG. II at the opposite end of the shaft 20', 20 or 112. Herein the manifold duct 100 is also connected to a central expansion cylindrical chamber 130 which may be coaxial to the shaft and its central duct and be internally threaded at 131 for receiving the threaded extension 136 for the bearing 132 at the opposite end of the shaft from the master cylinder 50. A lock nut or ring 133 may be provided for locking this extension 136 to the end of the shaft 20', and between the inner threaded end 135 of this bearing extension 136 and a piston 140 is an helical compression spring 142. The piston is sealed in the chamber by gaskets or O-rings 143, or preferably by a rolling type diaphragm (not shown), to prevent leakage of the fluid in the manifold duct 100. The volume of the chamber 130 is preferably sufficiently large that when the master cylinder piston 54 or 54' is at the end of its stroke, there still will be sufficient volume for only the maximum pressure limit to be applied to the fluid in the manifold 100 by means of the spring 142. This spring may be set to resist up to about 1000 psi so that, for example, if the system pressure is increased beyond 1000 psi because of operation of the master cylinder 50 by the wrench W, or because of head build up, or other reasons, then the spring 142 will compress allowing the piston 140 to retract to adjust the pressure in the system, or manifold 100 or 100', back to 1000 psi.

GRIPPING RAMS

Referring now to the different embodiments of the gripping rams 80, 80', and 40' shown in FIGS. IV, VII, VIII and XI, the outer button ends of these rams shown in FIGS. IV and VIII directly engage the inside diameter of the core C, while in FIG. VII the end abuts a leaf 30 and in FIG. XI it is attached to a leaf 30. Although the end of these rams are shown rounded, they may have other configurations as desired without departing from the scope of this invention, such as elongated strips or bars.

Preferred embodiments of these gripping rams 80 are shown in FIGS. IV and VII which are operated by rolling type diaphragms 84 which may be or may not be fastened against the inner flange ends 81 of the rams or pistons 80 by screws 83 through rounded edge washers 82. These diaphragms 84 preferably have peripheral integral O-ring type gaskets 85 so that their guide housings 86 and 86' can have their inner peripheral ends either clamp the gaskets 85 directly as shown in FIG. VII, or clamp them through a washer means 83 as shown in FIG. IV. These guide housings 86 and 86' enclose helical retracting springs 87 which react against the flanged inner ends 81 of the rams 80. These housings 86 and 86' may either be screwed into a threaded hole 88 as shown in FIG. IV, or held in a smooth hole 88' by a snap ring 89 in a groove 89' as shown in FIG. VII. The rolling type diaphragms 84 prevent scratches, caused by side thrusting between the gripping piston and its cylindrical hole, from causing leaks in the fluid pressure in the system, because no fluid pressure can reach these contacting and sliding parts. Thus the hydraulic fluid is introduced only into the inner portion or countersunk central portion of the cylindrical holes 88 and 88' communicating directly with the manifold duct 100, which inner portion is enclosed by the rolling diaphragm 84. Furthermore, the sliding parts used with a diaphragm do not have to be so carefully machined as they would have to be in the next embodiment shown in FIG. VIII.

The ram 80' in FIG. VIII acts as a piston in a hydraulic cylinder or housing 90, which housing 90 may be screwed into radial hole 88 and provides a piston chamber 91 with a sealing gasket 92 mounted in an internal groove 93 in the housing 90. This gasket 92 seals the hydraulic fluid which is introduced into the chamber 91 from the manifold duct 100, via one of its radial branch ducts 102. This pressurized fluid pushes the inner end of a piston ram 80' to force it outwardly into engagement with the core C, or a leaf 30, against the action of a retracting helical spring 94 which is held in a countersunk hole 95 in the inner end of the piston 80' by means of a screw 96. The other inner end of the spring 94 is held under the inner flange of ring 97, which ring 97 also seats a sealing O-ring gasket 98 against the bottom of the threaded hole 88 by means of a shoulder 99 in the housing 90. In this embodiment it is advantageous that an hydraulic oil with colloidally suspended metallic particles be employed for the pressurizing liquid in order to insure as much as possible the sealing of the cracks and scratches that may occur between the sides of the piston 80' and its guiding cylindrical housing 90. Furthermore, in order to reduce these scratches and leakage, it is important that these parts 80' and 90 be carefully machined, polished, and fitted.

Referring now to the larger core-shaft embodiment shown in FIGS. IX and X, the hydraulic radially extending guide pistons 40' and/or extendable pistons 80 are mounted around the peripheries of spaced disks 110 along the central hollow shaft 112. In this shaft 112 is a manifold duct 100' with radial ducts 102' (see FIG. X), which extend through the disks 110 to the combination guide and extendable pistons 40' shown enlarged and in section in FIG. XI. The left open end of the shaft 112 shown in FIG. IX is provided with a hollow cavity for threading in it a master cylinder assembly 50 of either the type shown in FIG. V or FIG. VI. It is to be understood that instead of, or in addition to, the hydraulic operated guide means 40' and shown in FIG. IX, there also may be provided a guide means as shown in FIG. III, on alternate disks 110, and only hydraulic operated rams or pistons 80 or 80' may be used on the intermediate disks 110 to push outwardly the leaves 30.

In FIG. XI the combination guide and ram 40' is shown to have a housing 120 having an inner cap 121 with an apertured and threaded inwardly projecting duct 122, which duct 122 screws into the outer internally threaded end of the radial duct 102' of manifold 100'. Inside the housing 120 is a chamber 123 for holding and guiding the guide and ram piston 40'. The inner flanged end 42' and this piston 40' is urged inwardly by means of a helical spring 124. Against the center of the inner flanged end 42' of the piston 40' is a rolling type diaphragm 125, which diaphragm 125 may be fastened by a round edge washer 126 and screw 127 to the central inner end of the piston 40'. The periphery of the diaphragm 125 may be held by the cap 121 clamping it to the housing 120 by means of screws 128. An O-ring 129 may be provided adjacent the threaded projecting duct 122 to seal the guide and ram assembly to the radial duct 102'. Thus not only does the piston 40' guide the radial extension of the leaf 30, but it also urges it outwardly by hydraulic pressure from the manifold 100' through the duct 102' into the inner chamber 123' and against the diaphragm 125.

It is to be clearly understood that the different forms or embodiments of the different parts of this invention can be interchanged, as often previously stated, without departing from the scope of this invention.

While there is described above the principles of this invention in connection with specific apparati, it is to be clearly understood that this description is made only by way of example and not as a limitation to the scope of this invention.

I claim:

1. A self-contained hydraulically expandable coreshaft having a closed fluid system comprising:
    A. a shaft having a longitudinal manifold duct therein with a chamber at one end thereof and a plurality of radially extending ducts therealong,
    B. a piston in said chamber to form a master cylinder,
    C. a substantially stable liquid in said cylinder and said ducts,
    D. separate rams at the outer ends of said radially extending ducts for projecting outwardly from the circumference of said shaft to grip the inside of a core surrounding said shaft,
    E. separate diaphragm means in said radially extending ducts between the inner ends of each of said rams and said liquid in said radial ducts, whereby leakage of said liquid is prevented around said plungers regardless of the liquid pressure and variations in torque on said shaft by said core,
    F. mechanical means for operating said piston in said master cylinder to pressurize said liquid to operate said rams,
    G. resilient means for normally urging said rams inwardly of the circumference of said shaft, and
    H. contractable and expandable means connected to said manifold ducts in said shaft for limiting and maintaining an upper maximum pressure up to about 1000 psi in said system that can be applied to said diaphragms.

2. A shaft according to claim 1 wherein said means for maintaining said pressure comprises a second chamber in said shaft connected to said ducts and containing a second piston for limiting the pressure that can be applied to said diaphragm means.

3. A shaft according to claim 1 wherein said diaphragm means are of the rolling type.

4. A shaft according to claim 1 wherein said stable liquid contains a colloidal suspension of metallic particles.

5. A shaft according to claim 1 including longitudinally spaced disks and longitudinal sector sleeves around and bridging adjacent disks, said sleeves being connected to said disks, and said rams being mounted in at least some of said disks for outwardly expanding said sleeves.

6. A shaft according to claim 1 wherein its outer surface is provided with a coating having a relatively high coefficient of friction.

7. A shaft according to claim 1 wherein said resilient means comprises separate spring means associated with each of said rams.

8. A shaft according to claim 1 including longitudinal sector leaves radially anchored to said shaft and outwardly expanded by said rams.

9. A shaft according to claim 8 wherein said rams are anchored to said leaves.

10. A shaft according to claim 8 including radial guide means along said shaft anchored at spaced locations to said sector leaves.

11. A shaft according to claim 10 wherein said guide means include resilient means for urging said leaves radially inwardly towards the axis of said shaft.

12. A shaft according to claim 1 wherein said mechanical means for operating said piston is a threaded sleeve around said master cylinder.

13. A shaft according to claim 12 including means for locking said piston in position to maintain pressure in said ducts.

14. A shaft according to claim 1 wherein said substantially stable liquid has less than one half a percent expansion by volume between about 0° and 200° F.

15. A shaft according to claim 1 wherein stable liquid has an expansion of less than one half a percent by volume between about 60° and 100° F.

16. A shaft according to claim 1 wherein said diaphragm means have O-ring gaskets integrally formed therein for sealing their peripheries in said radially extending ducts.

17. A shaft according to claim 1 wherein said piston in said master cylinder has a roll type diaphragm between it and said liquid in said ducts.

18. A shaft according to claim 1 having longitudinally spaced disks with radial ducts therein and with said rams circumferentially located on said disks.

* * * * *

UNITED STATES PATENT OFFICE
CERTIFICATE OF CORRECTION

Patent No. 4,050,643      Dated September 27, 1977

Inventor(s) Arthur D. Secor

It is certified that error appears in the above-identified patent and that said Letters Patent are hereby corrected as shown below:

Column 3, line 11, change "segmentes" to - - segments - - ; line 52, change "to" to - - for - - . Column 5, line 33, cancel "the". Column 6, line 27, change "30" to - - 80 - - .

Signed and Sealed this

Fourth Day of April 1978

[SEAL]

Attest:

RUTH C. MASON
Attesting Officer

LUTRELLE F. PARKER
Acting Commissioner of Patents and Trademarks